US00RE50376E

(19) United States
(12) Reissued Patent
Uyehara et al.

(10) Patent Number: US RE50,376 E
(45) Date of Reissued Patent: Apr. 8, 2025

(54) DISTRIBUTED ANTENNA SYSTEM WITH ADAPTIVE ALLOCATION BETWEEN DIGITIZED RF DATA AND IP FORMATTED DATA

(71) Applicant: CommScope Technologies LLC, Hickory, NC (US)

(72) Inventors: Lance K. Uyehara, San Jose, CA (US); Boris Golubovic, San Francisco, CA (US)

(73) Assignee: Outdoor Wireless Networks LLC, Richardson, TX (US)

(21) Appl. No.: 17/961,467

(22) Filed: Oct. 6, 2022

Related U.S. Patent Documents

Reissue of:

(64) Patent No.: 10,797,759
Issued: Oct. 6, 2020
Appl. No.: 14/814,134
Filed: Jul. 30, 2015

U.S. Applications:

(60) Provisional application No. 62/040,840, filed on Aug. 22, 2014.

(51) Int. Cl.
*H04B 7/024* (2017.01)

(52) U.S. Cl.
CPC ..... *H04B 7/024* (2013.01)

(58) Field of Classification Search
CPC ..... H04B 7/024
See application file for complete search history.

(56) References Cited

U.S. PATENT DOCUMENTS 7,483,504 B2 1/2009 Shapira et al.
8,195,224 B2 6/2012 Saban et al.
8,213,401 B2 * 7/2012 Fischer ..... H04W 88/085 370/345

(Continued)

FOREIGN PATENT DOCUMENTS

WO 2014048866 4/2014
WO 2014048866 A1 4/2014

OTHER PUBLICATIONS

U.S. Patent and Trademark Office, "Advisory Action", U.S. Appl. No. 14/814,134, filed Jan. 2, 2020, pp. 1 through 5, Published: US.

(Continued)

*Primary Examiner* — Matthew E Heneghan
(74) *Attorney, Agent, or Firm* — Fogg & Powers LLC

(57) ABSTRACT

Embodiments described herein provide for a distributed antenna system including a host unit and an active antenna unit (AAU). The AAU is configured to wirelessly communicate with, and to receive uplink radio frequency (RF) signals from, one or more wireless devices. The AAU is further configured to sample the uplink RF signals to generate digitized RF data. The AAU includes an Ethernet interface for receiving Internet Protocol (IP) formatted data from an IP device coupled to the Ethernet interface. The AAU is configured to transport the digitized RF data and the IP formatted data over a transport signal to the host unit, the transport signal including a plurality of bits. The AAU is configured to adaptively adjust the number of bits that are allocated to the digitized RF data and the number of bits that are allocated to the IP formatted data.

54 Claims, 5 Drawing Sheets

(56) References Cited

U.S. PATENT DOCUMENTS

| | | | | |
|---|---|---|---|---|
| 8,346,278 | B2 * | 1/2013 | Wala | G01S 5/0054 370/210 |
| 10,797,759 | B2 | 10/2020 | Uyehara et al. | |
| 2004/0106387 | A1 * | 6/2004 | Bauman | H04W 52/42 455/232.1 |
| 2010/0177759 | A1 * | 7/2010 | Fischer | H04W 88/085 370/345 |
| 2010/0177760 | A1 * | 7/2010 | Cannon | H04L 27/002 370/345 |
| 2011/0130163 | A1 | 6/2011 | Saban et al. | |
| 2011/0170476 | A1 | 7/2011 | Shapira et al. | |
| 2011/0268446 | A1 | 11/2011 | Cune et al. | |
| 2011/0274206 | A1 * | 11/2011 | Catreux | H04B 7/0615 375/295 |
| 2012/0004918 | A1 * | 1/2012 | Feng | G10L 19/002 704/500 |
| 2013/0003658 | A1 * | 1/2013 | Stewart | H04B 7/022 370/328 |
| 2013/0107763 | A1 | 5/2013 | Uyehara et al. | |
| 2013/0136202 | A1 * | 5/2013 | Kummetz | H04L 25/05 375/267 |
| 2013/0201916 | A1 | 8/2013 | Kummetz et al. | |
| 2013/0308537 | A1 | 11/2013 | Kummetz et al. | |
| 2014/0036780 | A1 | 2/2014 | Sabat, Jr. et al. | |
| 2014/0079037 | A1 | 3/2014 | Evans et al. | |
| 2014/0146905 | A1 * | 5/2014 | Zavadsky | H04B 7/0802 375/267 |
| 2014/0146906 | A1 | 5/2014 | Zavadsky et al. | |
| 2016/0056866 | A1 | 2/2016 | Golubovic et al. | |

OTHER PUBLICATIONS

European Patent Office, "Communication under Rule 71(3) EPC from EP Application No. 15833174.4", from Foreign Counterpart to U.S. Appl. No. 14/814,134, filed Apr. 28, 2022, pp. 1 through 49, Published: EP.

European Patent Office, "Summons to attend oral proceedings pursuant to Rule 115(1) EPC from EP Application No. 15833174.4", from Foreign Counterpart to U.S. Appl. No. 14/814,134, filed Jul. 22, 2021, pp. 1 through 8, Published: EP.

U.S. Patent and Trademark Office, "Final Office Action", U.S. Appl. No. 14/814,134, filed Jan. 10, 2019, pp. 1 through 28, Published: US.

U.S. Patent and Trademark Office, "Final Office Action", U.S. Appl. No. 14/814,134, filed Oct. 9, 2019, pp. 1 through 24, Published: US.

U.S. Patent and Trademark Office, "Final Office Action", U.S. Appl. No. 14/814,134, filed Aug. 1, 2017, pp. 1 through 27, Published: US.

U.S. Patent and Trademark Office, "Notice of Allowance", U.S. Appl. No. 14/814,134, filed May 28, 2020, pp. 1 through 11, Published: US.

U.S. Patent and Trademark Office, "Office Action", U.S. Appl. No. 14/814,134, May 9, 19, pp. 1-24, Published: US.

U.S. Patent and Trademark Office, "Office Action", U.S. Appl. No. 14/814,134, filed Jan. 31, 2017, pp. 1 through 41, Published: US.

U.S. Patent and Trademark Office, "Notice of Panel Decision from Pre-Appeal Brief Review", U.S. Appl. No. 14/814,134, filed Nov. 22, 2017, pp. 1 through 2, Published: US.

U.S. Patent and Trademark Office, "Office Action", U.S. Appl. No. 14/814,134, filed Jun. 1, 2018, pp. 1 through 22, Published: US.

Australian Government IP Australia, "Examination Report No. 2 from AU Application No. 2015303845 mailed Jun. 7, 2019", from Foreign Counterpart to U.S. Appl. No. 14/814,134, pp. 1-3, Published: AU.

Australian Government, IP Australia, "Examination Report No. 1 for AU Application No. 2015303845 mailed Oct. 10, 2018", From Foreign Counterpart of U.S. Appl. No. 14/814,134; pp. 1-3; Published in AU.

Cisco, "White Paper: Mobile Access Indoor Wireless Solution and Cisco WLANS", Sep. 2010, pp. 1 through 5, Cisco Systems, Inc.

European Patent Office, "Communication pursuant to Article 94(3) EPC from EP Application No. 15833174.4", from Foreign Counterpart to U.S. Appl. No. 14/814,134, filed Dec. 3, 2019, pp. 1-7, Published: EP.

European Patent Office, "Communication pursuant to Article 94(3) from EP Application No. 15833174.4 dated Jan. 16, 2019", from Foreign Counterpart to PCT Application No. PCT/US2015/043010, filed Jan. 16, 2019, pp. 1-6, Published: EP.

European Patent Office, "Communication pursuant to Article 94(3) from EP Application No. 15833174.4", from Foreign Counterpart to U.S. Appl. No. 14/814,134, filed Jul. 22, 2020, pp. 1 through 7, Published: EP.

European Patent Office, "Extended European Search Report from EP Application No. 15833174.4", from Foreign Counterpart to U.S. Appl. No. 14/814,134, filed Mar. 13, 2018, pp. 1 through 8, Published: EP.

International Searching Authority, "International Search Report and Written Opinion from PCT Application No. PCT/US2015/043010", from Foreign Counterpart to U.S. Appl. No. 14/814,134, filed Nov. 13, 2015, pp. 1 through 16, Published: WO.

International Searching Authority, "International Searching Report and Written Opinion from PCT Application No. PCT/US2015/043012", from Foreign Counterpart to U.S. Appl. No. 14/814,164, filed Nov. 6, 2015, pp. 1 through 16, Published: WO.

Li et al., "Efficient HetNet Implementation Using Broadband Wireless Access With Fiber-Connected Massively Distributed Antennas Architecture", IEEE Wirless Communications, Jun. 2011, pp. 72 through 78, IEEE.

U.S. Patent and Trademark Office, "Office Action", U.S. Appl. No. 14/814,134, filed May 9, 2019, pp. 1 through 24, Published: US.

U.S. Patent and Trademark Office, "Notice of Panel Decision from Pre-Appeal Brief Review", U.S. Appl. No. 14/814,134, Nov. 22, 2017, pp. 1 through 2, Published: US.

"White Paper: Mobile Access Indoor Wireless Solution and Cisco WLANs", Sep. 2010, pp. 1-5, Publisher: Cisco Systems, Inc., Published in: San Jose, CA.

"MobileAccessVE: Coverage and Capacity Made Simple with Cellular-over-LAN", Nov. 2011, pp. 1-2, Publisher: Corning MobileAccess, Inc., Published in: Vienna, Virginia.

International Search Authority, "International Search REport and Written Opinion for PCT Application No. PCT/US2015/043012", "from U.S. Appl. No. 14/814,164", dated Nov. 6, 2015, pp. 1-16, Published in: WO.

Haoming Li et al., "Efficient HetNet Implementation Using Broadband Wireless Access with Fiber-Connected Massively Distributed Antennas Architecture.", "IEEE Wireless Communications", Jun. 2011, pp. 72-78, vol. 18, No. 3, Publisher: IEEE.

United States Patent and Trademark Office, "Restriction Requirement", "From U.S. Appl. No. 14/814,164", dated Apr. 12, 2017, pp. 1-7, Published in: US.

European Patent Office, "Communication pursuant to Article 94(3) from EP Application No. 15833174.4 dated Jan. 16, 2019", from Foreign Counterpart to U.S. Appl. No. 14/814,134, dated Jan. 16, 2019, pp. 1-6, Published: EP.

* cited by examiner

DISTRIBUTED ANTENNA SYSTEM WITH ADAPTIVE ALLOCATION BETWEEN DIGITIZED RF DATA AND IP FORMATTED DATA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of application Ser. No. 14/814,134, filed Jul. 30, 2015, which issued as U.S. Pat. No. 10,797,759, and which* claims the benefit of U.S. Provisional Patent Application Ser. No. 62/040,840, filed on Aug. 22, 2014, which is hereby incorporated herein by reference.

BACKGROUND

Distributed Antenna Systems (DAS) are used to distribute wireless signal coverage into buildings or other substantially closed environments. For example, a DAS may distribute antennas within a building. The antennas are typically connected to a radio frequency (RF) signal source, such as a service provider. Various methods of transporting the RF signal from the RF signal source to the antenna have been implemented in the art.

SUMMARY

Embodiments described herein provide for a distributed antenna system (DAS). The DAS includes a host unit and an active antenna unit (AAU) communicatively coupled to the host unit over a communication link. The AAU is configured to wirelessly communicate with one or more wireless devices and to receive uplink radio frequency (RF) signals from the one or more wireless devices. The AAU is further configured to sample the uplink RF signals to generate first digitized RF data. The AAU includes an Ethernet interface for receiving first Internet Protocol (IP) formatted data from a first IP device coupled to the Ethernet interface. The AAU is configured to transport the first digitized RF data and the first IP formatted data over a first transport signal to the host unit, the first transport signal including a first plurality of bits. The AAU is configured to adaptively adjust the number of bits that are allocated to the first digitized RF data and the number of bits that are allocated to the first IP formatted data.

DRAWINGS

Understanding that the drawings depict only examples and are not therefore to be considered limiting in scope, the examples will be described with additional specificity and detail through the use of the accompanying drawings, in which.

In accordance with common practice, the various described features are not drawn to scale but are drawn to emphasize specific features relevant to the examples. Like reference numbers and designations in the various drawings indicate like elements.

DETAILED DESCRIPTION

The embodiments described below describe a distributed antenna system (DAS) and components within the distributed antenna system (DAS). The distributed antenna system is connected to at least one radio access network (RAN) through at least one radio access network (RAN) interface. In exemplary embodiments, the distributed antenna system includes a distributed antenna system host unit that interfaces with the at least one radio access network (RAN) and at least a first Ethernet device. The distributed antenna system also includes at least one active antenna unit (AAU) that transmits and receives wireless radio frequency (RF) signals with one or more wireless devices and interfaces with a second Ethernet device. The host unit and AAU are operable to communicate transport signals therebetween that include both digitized RF data corresponding to signals from the RAN and wireless devices as well as internet protocol (IP) formatted data from the corresponding Ethernet device over one or more communication links. In addition, the host unit and the AAU are operable to adaptively adjust the number of bits in the respective transport signal that are allocated to the digitized RF data and the IP formatted data.

Figure 1:
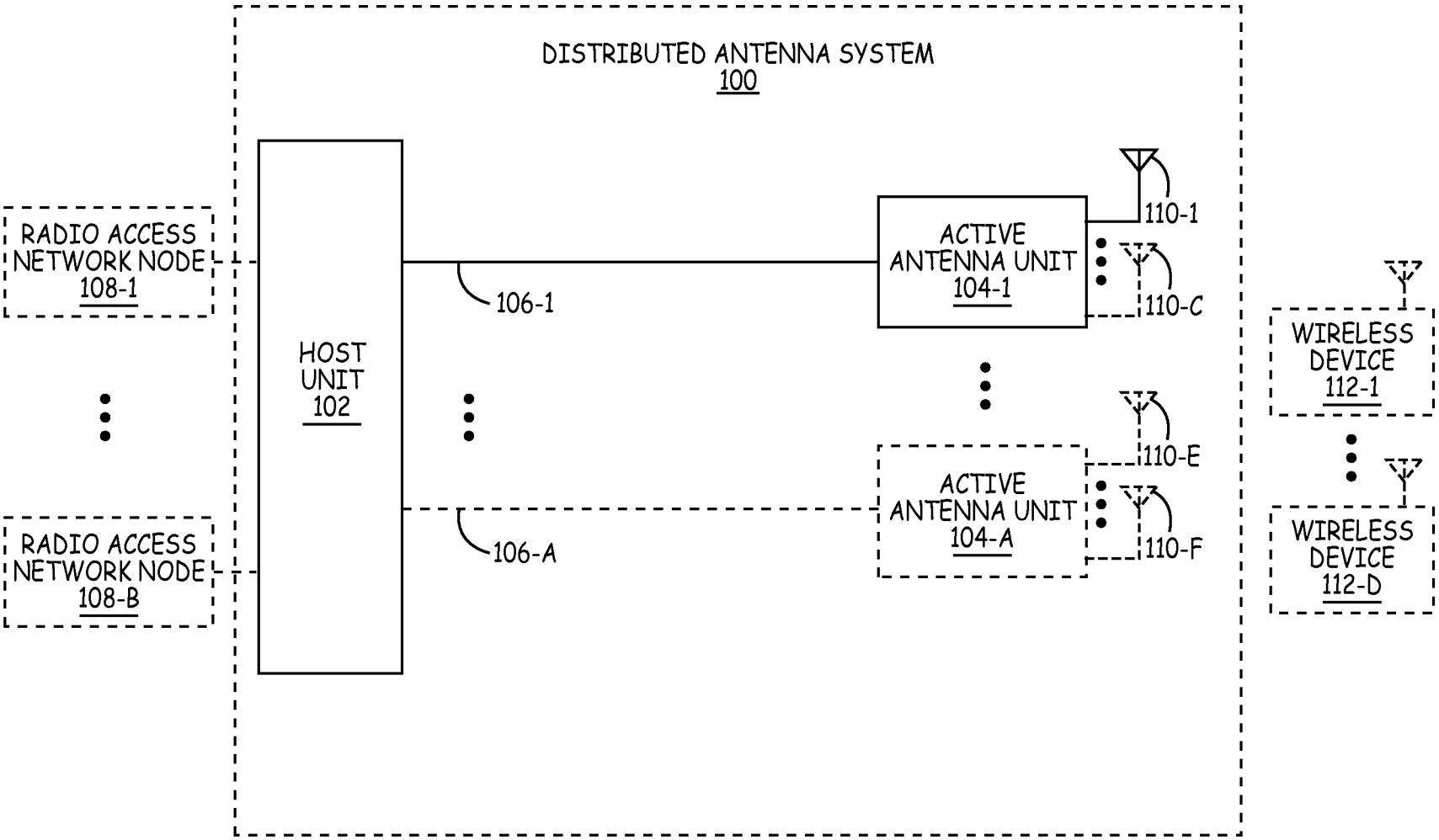
FIG. 1 is block diagram of an example of a distributed antenna system (DAS) that transports signals between a host unit and at least one active antenna units (AAU) over at least one communication link.

FIG. 1 is a block diagram of an example distributed antenna system 100. Distributed antenna system 100 includes a host unit 102 and at least one active antenna unit (AAU) 104 (including AAU 104-1 and any quantity of optional AAUs 104 through optional AAU 104-A) communicatively coupled to the host unit 102 through at least one communication link 106 (including communication link 106-1 and any quantity of optional communication links 106 through optional communication link 106-A). Specifically, AAU 104-1 is communicatively coupled to the host unit 102 across communication link 106-1 and optional AAU 104-A is communicatively coupled to the host unit 102 across communication link 106-A. Each communication link 106 can comprise a twisted pair cable, coaxial cable, optical fiber, or wireless communication link. In an example, each communication link 106 is an "Ethernet cable" that conforms to one of the category 5, category 5e, category 6, category 6a, and category 7 specifications. Future communication link specifications used for Ethernet signals are also included. In some examples, multiple communication links 106 can be coupled in series between the host unit 102 and one or more of the AAUs 104. In such examples, a passive device such as a patch panel or wall outlet can be coupled between the host unit 102 and an AAU 104 to couple such serially coupled cables together.

The host unit 102 is communicatively coupled to at least one radio access network (RAN) node 108 (including radio access network (RAN) node 108-1 and any quantity of optional radio access network (RAN) node 108 through optional radio access network (RAN) node 108-B). The host unit 102 is configured to bi-directionally communicate signals with the RAN node 108, wherein the signals correspond to a cellular (wireless) radio frequency (RF) band. As used herein, a downlink signal "corresponds to" a cellular RF band if the downlink signal is an RF signal in a cellular RF band or is used to derive a wireless RF signal in a cellular RF band. Similarly, an uplink signal "corresponds to" a cellular RF band if the uplink signal is an RF signal in a cellular RF band or is derived from a RF signal in a cellular RF band. Examples of signals used to derive or derived from an RF signal in a cellular RF band include frequency shifted versions of the RF signal (e.g., an intermediate frequency (IF) or baseband signal), a base station communication protocol signal (e.g., CPRI, OBSAI) corresponding to the RF signal, internet protocol (IP) data corresponding to the RF signal, a signal containing digital (e.g., I and Q) samples of the RF signal, or a signal containing digital samples of an IF or baseband version of the RF signal. Each RAN node 108 can comprise a base station, base transceiver station, IP gateway, baseband unit, or other radio access network device.

In the downlink, the host unit 102 receives a downlink signal corresponding to a cellular RF band from a RAN node 108, and generates a transport signal based on the downlink signal. The host unit 102 sends the transport signal over the communication link 106 to the AAU 104 coupled to the communication link 106. In an example, the transport signal contains digital samples of an RF signal or digital samples of an IF or baseband version of the RF signal. Such digital samples are also referred to herein as "digitized RF data", regardless of whether the digital samples are of an RF signal, IF signal, or baseband signal. The AAU 104 receives the transport signal, and generates an RF signal in the cellular RF band based on the digitized RF data. The AAU 104 wirelessly transmits the RF signal in the cellular RF band from at least one antenna 110 to a wireless device 112.

In the uplink, the AAU 104 receives a wireless RF signal in the cellular RF band at the at least one antenna 110 from a wireless device 112. The AAU 104 generates a transport signal including digitized RF data based on the RF signal received and sends the transport signal over the communication link 106 to the host unit 102. The host unit 102 receives the transport signal and generates an uplink signal formatted for the RAN node 108 based on the digitized RF data, such that the uplink signal corresponds to the wireless RF signal received at the AAU 104. The host unit 102 sends the uplink signal to the RAN node 108.

Each AAU 104 is configured to transmit a radio frequency signal in the cellular radio frequency band to at least one wireless device 112 (including wireless device 112-1 and any quantity of optional wireless devices 112 through optional wireless device 112-D) using at least one antenna 110. In examples, at least one AAU 104-1 is configured to transmit one downlink radio frequency signal to one wireless device 112-1 using one or a set of antennas 110-1 through 100-C and another radio frequency signal to another wireless device 112-D using the one or set of antennas 110-1 through 100-C. In examples, the AAU 104-1 is configured to transmit and receive a single RF signal at a time.

Similarly in the reverse/uplink path, in examples, each AAU 104 is configured to receive an uplink radio frequency (RF) signal from at least one wireless device 112 using at least one antenna 110. Each AAU 104 is further configured to convert the radio frequency signals to a transport signal as described above.

In examples, a master reference clock is distributed between the various components of the distributed antenna system 100 to keep the various components locked to the same clock. In examples, the master reference clock is generated based on a signal received from the at least one radio access network 108-1. In examples, the master reference clock is generated within another component of the distributed antenna system, such as an AAU 104.

In addition to digitized RF data, DAS 100 transports IP formatted data on the at least one communication link 106. The IP formatted data is sent through the DAS 100 between a first Ethernet device 114 coupled to the host unit and a second Ethernet device 116 coupled to the AAU 104.

Figure 2:
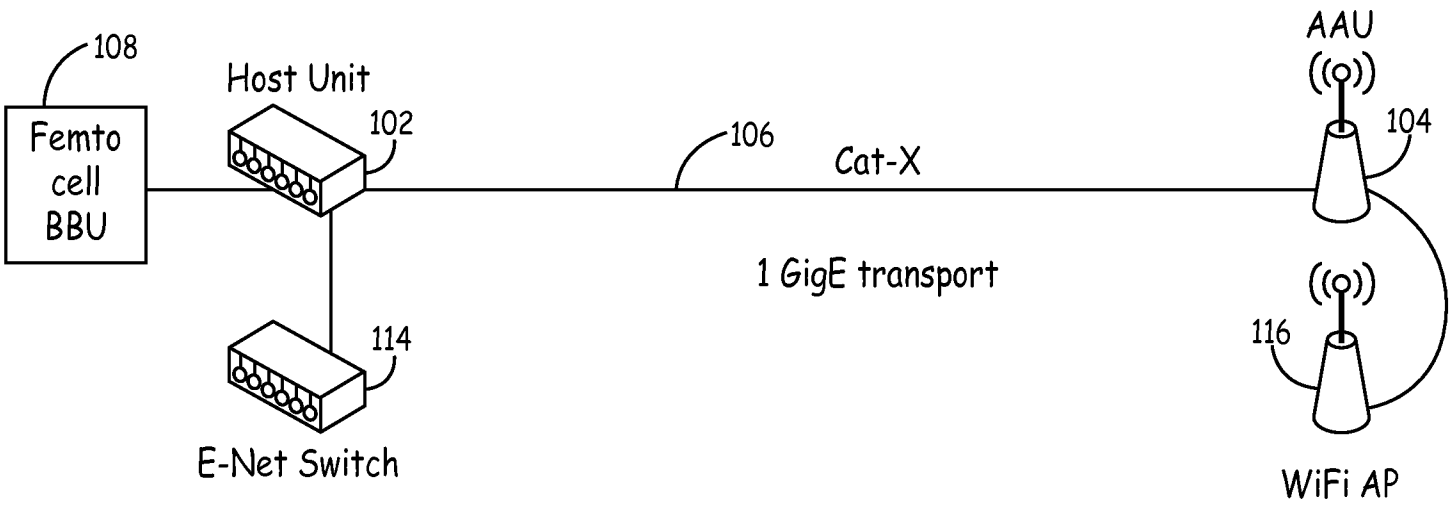
FIG. 2 is a block diagram of an example of a single communication link in the DAS of FIG. 1 wherein the DAS is set to transport the Ethernet signals along with the transport signals over the communication link.

FIG. 2 illustrates an example of a single communication link 106 in the DAS 100 wherein the DAS 100 is set to transport the IP formatted data along with the digitized RF data over the communication link 106. To enable such transport, the host unit 102 is coupled to at least the first Ethernet device 114 and communicates Ethernet signals with the first Ethernet device 114. Ethernet signals are signals in compliance with an IEEE 802.3 standard. Such signals are comprised of Ethernet frames. In an example, such Ethernet frames can transport IP formatted data, such as TCP/IP data, between the first Ethernet device 114 and the host unit 102. This communication with the first Ethernet device 114 forms a first Ethernet link.

The digitized RF data and IP formatted data are transported between the host unit 102 and an AAU 104 using at least one uplink transport signal (from the host unit 102 to the AAU 104) and at least one downlink transport signal (from the AAU 104 to the host unit 102). A transport signal includes a plurality of bits of digital data, and can be sent over the communication link 106 in any suitable manner, including, but not limited to, modulating the transport signal onto an RF signal. The plurality of bits of the transport signal can be organized in any suitable manner. In an example, the plurality of bits are organized into communication frames, where each communication frame includes a certain number of bits allocated to payload data. In such an example, the digitized RF data and the IP formatted data are transported within such payload data of a communication frame. The transport signal can also be organized as a serial data stream or into a plurality of packets.

In the downlink direction, the host unit 102 generates or obtains digitized RF data from a downlink signal received from RAN 108. The host unit 102 also receives IP formatted data from the first Ethernet device 114. The host unit 102 multiplexes the IP formatted data with the digitized RF data into a transport signal and then sends the transport signal over the communication link 106 to the AAU 104. In addition, the host unit 102 adaptively adjusts the number of bits in the transport signal that are allocated to the digitized RF data and the number of bits in the transport signal that are allocated to the IP formatted data. In this way, the host unit 102 can adaptively adjust the bandwidth provided to the digitized RF data and the IP formatted data in the transport to the AAU 104. This can be advantageous in bandwidth limited situations, such as when the transport signal is sent over a communication link 106.

In an example, the host unit 102 can adaptively adjust the number of bits allocated to digitized RF data and IP formatted data by adjusting the number of bits in a communication frame that are allocated to each respectively. For example, if a first communication frame has a certain portion of the payload bits allocated to digitized RF data and the other portion of the payload bits allocated to IP formatted data, the host unit 102 can adjust the number of bits allocated to each such that a different portion of the payload bits in a second frame are allocated to digitized RF data with the remaining portion (also a different amount) allocated to IP formatted data. Thus, different frames can have different allocations, such that the bandwidth allocated to digitized RF data and IP formatted data can change over time. The host unit 102 can be configured to adjust the allocation on a frame-by-frame basis such that each frame can be adaptively set to have the same or a different allocation than the previous frame. The adaptive adjustment of the bit allocation can be used to account for variation in the amount of digitized RF data and/or IP formatted data transported over time.

In a first example, the host unit 102 can give priority to the digitized RF data over IP formatted data. In such an example, if the amount of digitized RF data to be transported to the AAU 104 increases above the amount currently allocated in the transport signal, the host unit 102 can adjust the amount allocated such that more of the payload bits are allocated to the digitized RF data. Given a fixed number of bits to allocate (e.g., per communication frame), allocating more payload bits to digitized RF data will involve allocating fewer payload bits to IP formatted data. When the amount of digitized RF data to be transported decreases, the number of bits allocated to the digitized RF data decreases and the number of bits allocated to the IP formatted data increases.

In an example, there is a standard allocation of bits which includes a certain number of bits for digitized RF data and a certain number of bits for IP formatted data. If the amount of digitized RF data or IP formatted data, however, increases above the number of bits in the standard allocation, the host unit 102 can adjust the bit allocation to accommodate such an increase. In examples, where the total amount of bits including both the digitized RF data and the IP formatted data is more than the total number of bits (e.g., in a communication frame) that can be transmitted, the host unit 102 can implement a priority scheme to prioritize certain data over other data and adjust the allocation accordingly. Any suitable priority scheme can be used, including schemes that discard data, schemes that delay data, schemes that re-route data, and schemes that prioritize data based on a number of different factors. In some situations, a communication frame may have no IP formatted data therein; that is, all of the payload data may be allocated to digitized RF data. In other situations, a communication frame may have no digitized RF data therein; that is, all of the payload data may be allocated to IP formatted data.

In an example, the host unit 102 and/or AAUs 104 can autonomously detect the amount of usage of digitized RF data and/or amount of usage of IP formatted data to determine the allocation to use for each frame. In an implementation of such an example, the host unit 102 and/or AAUs 104 could autonomously detect the amount of usage of digitized RF data by monitoring power in resource blocks of an RF signal complying with a long-term evolution (LTE) communication protocol. In an implementation of such an example, the host unit 102 and/or AAUs 104 could autonomously detect the amount of usage of digitized RF data for code division multiple access (CDMA) radio access technologies by monitoring power within a channel and/or by monitoring the number of spreading codes being used to determine the number of active channels.

In an implementation of such an example, the host unit 102 and/or AAUs 104 can estimate the amount of IP formatted data by monitoring usage over the connected Ethernet interfaces. In some embodiments, the host unit 102 can include an Ethernet switch or router function to reduce or limit the IP formatted data sent to the AAUs 104 to packets based on whether the packets are intended for IP devices associated with a corresponding communication link 106 between a host unit 102 and one or more AAUs 104 is sent on that communication link 106.

If the host unit 102 and/or AAUs 104 determine that the amount of digitized RF data has changed, the host unit 102 can modify the allocation of the bits as described herein. In some examples, the host unit 102 can increase or reduce data compression of the corresponding RF signal instead of or in addition to modifying the allocation of bits between digitized RF data and IP formatted data. Any appropriate data compression scheme can be used. For example, if the RF signal is an LTE signal, the spectral bandwidth of the signal can be reduced by only using resource blocks closer to the center frequency. Such a technique can be used to reduce a 20 Mhz LTE carrier to 5 Mhz or even 1.4 Mhz depending on the amount of data that needs to be carried. Reducing the spectral bandwidth would also reduce the amount of spectrum that needs to be digitized by the DAS 100. In an example, the reduction of spectral bandwidth is coordinated with the RAN node 108. In another example, the reduction of spectral bandwidth can be performed autonomously (i.e., without coordination with the RAN node 108) by the DAS 100, and the RAN node 108 and wireless devices 112 can adapt accordingly. Other data compression schemes that can be used include schemes employing mantissa and exponent compression or schemes based on Mu-law companding.

In some examples, the host unit 102 and AAUs 104 can drop packets that exceed the capacity allocated at that time. In some examples, the host unit 102 and AAUs 104 can implement a quality of service (QoS) scheme to determine which packets to drop and/or to determine which packets to hold for a later potential transport on the corresponding communication link 106. Dropping of IP packets shouldn't result in a substantial loss of data and will provide for a graceful degradation of IP transport since the upper layers of the Ethernet protocol stack will take care of re-transmissions and throttling to support the IP formatted data. As should be understood, multiple of such allocation schemes can be used together concurrently.

The host unit 102 can communicate the allocation of bits to the AAU 104 in any suitable manner. In an example, the allocation of bits in a communication frame is indicated in the header of the communication frame. Thus, the host unit 102 indicates in the header of each communication frame which bits are allocated to digitized RF data and which bits are allocated to IP formatted data.

In any case, the AAU 104 receives the transport signal from the host unit 102, extracts the digitized RF data and generates a downlink RF signal based on the digitized RF data. The AAU 104 also extracts the IP formatted data and generates an Ethernet signal to send over its Ethernet interface to a second Ethernet device 116 coupled to the AAU 104. Since the allocation of digitized RF data and IP formatted data in the transport signal is adaptively adjusted by the host unit 102, the AAU 104 adaptively adjusts to the allocation of bits in order to use the varying number of bits to transmit the downlink wireless RF signal and to send the IP formatted data to the second Ethernet device 116. The AAU 104 adaptively adjusts based on the indication of the allocation from the host unit 102. In an example, the AAU 104 adaptively adjusts by reading the information in the header of each communication frame, indicating the allocation of the bits of that communication frame, and extracts the data accordingly.

Using the IP formatted data transported over the communication link 106 to the AAU 104, the first Ethernet device 114 can communicate with the second Ethernet device 116 using a wired Ethernet protocol (i.e., an IEEE 802.3 protocol). The first and second Ethernet device 114, 116, can be any device configured to send and receive signals conforming to a wired Ethernet protocol. For example, the first Ethernet device 114 can be an Ethernet switch, and the second Ethernet device 116 can be a wireless local area network (WLAN) access point (also referred to herein as a "wireless access point"). In an example, such a WLAN access point complies with an IEEE 802.11 standard for transmitting and receiving wireless LAN signals. In other examples, the first and/or second Ethernet device 114, 116 can include an Ethernet router, switch, or hub, a personal computing device (e.g., desktop, laptop) having an Ethernet network interface, a wireless access point, or other device configured to send and receive Ethernet signals.

In the uplink, the AAU 104 generates digitized RF data from one or more uplink RF signals received from one or more wireless devices 112. The AAU 104 also receives IP formatted data from the second Ethernet device 116. The AAU 104 multiplexes the IP formatted data with the digitized RF data into a transport signal and then sends the transport signal over the communication link 106 to the host unit 102. In addition, the AAU 104 adaptively adjusts the number of bits in the transport signal that are allocated to the digitized RF data and the number of bits in the transport signal that are allocated to the IP formatted data. In this way, the AAU 104 can adaptively adjust the bandwidth provided to the digitized RF data and the IP formatted data in the transport to the host unit 102. This can be advantageous in bandwidth limited situations, such as when the transport signal is sent over a communication link 106.

In an example, the AAU 104 can adaptively adjust the number of bits allocated to digitized RF data and IP formatted data by adjusting the number of bits in a communication frame that are allocated to each respectively. For example, if a first communication frame has a certain portion of the payload bits allocated to digitized RF data and the other portion of the payload bits allocated to IP formatted data, the AAU 104 can adjust the number of bits allocated to each such that a different portion of the payload bits in a second frame are allocated to digitized RF data with the remaining portion (also a different amount) allocated to IP formatted data. The AAU 104 can be configured to adjust the allocation on a frame-by-frame basis such that each frame can be adaptively set to have the same or a different allocation than the previous frame. The adaptive adjustment of the bit allocation can be used to account for variation in the amount of digitized RF data and/or IP formatted data transported over time.

In a first example, the AAU 104 can give priority to the digitized RF data over IP formatted data. In such an example, if the amount of digitized RF data to be transported to the host unit 102 increases above the amount currently allocated in the transport signal, the AAU 104 can adjust the amount allocated such that more of the payload bits are allocated to the digitized RF data. Given a fixed number of bits to allocate (e.g., per communication frame), allocating more payload bits to digitized RF data will involve allocating fewer payload bits to IP formatted data. When the amount of digitized RF data to be transported decreases, the number of bits allocated to the digitized RF data decreases and the number of bits allocated to the IP formatted data increases.

In an example, there is a standard allocation of bits which includes a certain number of bits for digitized RF data and a certain number of bits for IP formatted data. If the amount of digitized RF data or IP formatted data, however, increases above the number of bits in the standard allocation, the AAU 104 can adjust the bit allocation to accommodate such an increase. In examples, where the total amount of bits including both the digitized RF data and the IP formatted data is more than the total number of bits (e.g., in a communication frame) that can be transmitted, the AAU 104 can implement a priority scheme to prioritize certain data over other data and adjust the allocation accordingly. Any suitable priority scheme can be used, including schemes that discard data, schemes that delay data, schemes that re-route data, and schemes that prioritize data based on a number of different factors. In some situations, a communication frame may have no IP formatted data therein; that is, all of the payload data may be allocated to digitized RF data. In other situations, a communication frame may have no digitized RF data therein; that is, all of the payload data may be allocated to IP formatted data.

The AAU 104 can communicate the allocation of bits to the host unit 102 in any suitable manner. In an example, the allocation of bits in a communication frame is indicated in the header of the communication frame. Thus, the AAU 104 indicates in the header of each communication frame which bits are allocated to digitized RF data and which bits are allocated to IP formatted data. In an example, the host unit 102 controls the allocation of bits between digitized RF data and IP formatted data in the transport signal sent from the AAU 104. In such an example, the host unit 102 indicates the allocation of bits to the AAU 104 in any suitable manner, such as in a control message. The AAU 104 allocates the bits according to the control message receive from the host unit 102.

In any case, the host unit 102 receives the transport signal from the AAU 104, extracts the digitized RF data and generates a signal based on the digitized RF data to send to the RAN 108. The host unit 102 also extracts the IP formatted data and generates an Ethernet signal to send over its Ethernet interface to the first Ethernet device 114. Since the allocation of digitized RF data and IP formatted data in the transport signal is adaptively adjusted by the AAU 104, the host unit 102 adaptively adjusts to the allocation of bits in order to use the varying number of bits to transmit the downlink wireless RF signal and to send the IP formatted data to the first Ethernet device 114. The host unit 102 can adaptively adjust based on the indication of the allocation from the AAU 104 or based on its directed allocation to the AAU 104. In an example, the host unit 102 adaptively adjusts by reading the information in the header of each communication frame, indicating the allocation of the bits of that communication frame, and extracts the data accordingly.

Using the same communication link 106 to transport digitized RF data and IP formatted data is advantageous because it enables the DAS 100 to be added on to an existing Ethernet network. For example, a building may have Ethernet cables already run to various locations throughout the building to provide wired or wireless local area network (LAN) service to those locations. In order to install a traditional DAS in the building coaxial or fiber optic cables would likely need to be run throughout the building, resulting in increased cost and time for the DAS installation. The DAS 100, however, can utilize the existing LAN cables to provide the transport between the host unit 102 and the at least one AAU 104, reducing or eliminating the expense and time required to run coaxial or fiber optic cables.

Although a single communication link 106 and corresponding AAU 104 and Ethernet device 116 are illustrated in FIG. 2, it should be understood that the configuration described with respect to FIG. 2 can be implemented on more than one communication link 106 that is connected to a host unit 102. Each such more than one communication link 106 would have a distinct AAU 104 coupled thereto with a distinct Ethernet device 116 coupled to each such AAU 104.

As described above with respect to FIGS. 1 and 2, a single host unit 102 can, and often does, have multiple communication links 106 coupled thereto. Each such communication link 106 can have a distinct AAU 104 coupled to the other end of such a cable 106. In some examples, the same digitized RF data is sent over each such communication link 106 coupled to the host unit 102, while each communication link 106 has respective IP formatted data sent thereover. Such a situation enables a set of AAUs 104 coupled to a host unit 102 to transmit simulcast signals, while also enabling distinct IP devices to be coupled to each AAU 104 and communicate individually. In such a situation, the host unit 102 multiplexes the downlink IP data with the digitized RF data by placing the IP formatted data corresponding to a particular IP device coupled along a communication link, along with the simulcast digitized RF data. Similarly, in the uplink, the host unit 102 can be configured to sum (e.g., digitally) the digitized RF data from each AAU 104 on each cable 106. A signal based on the summed digitized RF data can be provided to the RAN 108. The host unit 102, however, can individually pass the IP formatted data from each communication link 106 to the first IP device 114 (or distribute the IP formatted data amongst multiple IP devices 114) as distinct data, such that each second IP device 116 coupled to a respective AAU 104 has a distinct communication path with one or more corresponding first IP devices 114 coupled to the host unit 102.

In some examples, an intermediate or expansion unit (not shown) may be coupled between the host unit 102 and multiple AAUs 104. Such an intermediate or expansion unit can be configured to combine the digitized RF data from multiple uplink signals from multiple AAUs 104 (e.g., by summing the digitized RF data together) and to send a signal including the combined digitized RF data to the host unit 102. Such an intermediate or expansion unit can also be configured to copy or split a the digitized RF data in a downlink signal from the host unit 102 into multiple downlink signals which are sent to respective AAUs 104 or respective sets thereof. The intermediate device can also include an Ethernet device such as an Ethernet switch or router to individually couple the IP formatted data to/from each AAU 104 having an Ethernet port therein from/to the host unit 104. That is, the IP formatted data is not combined (uplink) and split (downlink) along with the digitized RF data. Instead, each AAU 104 having an Ethernet port has a distinct communication path to and from the host unit 102 through the intermediate unit.

In other examples, the digitized RF data can also be individually (or by sub-set) provided to/from the AAUs 104. Moreover, in some examples, a given transport signal can transport only digitized RF data or only IP formatted data, concurrently with other transport signals can transport both digitized RF data and IP formatted data. Finally, the adaptive bit allocation for each transport signal (i.e., between digitized RF data and IP formatted data) can be set individually, in sets, or can be kept the same for all uplink and/or downlink transport signals.

Figure 3:
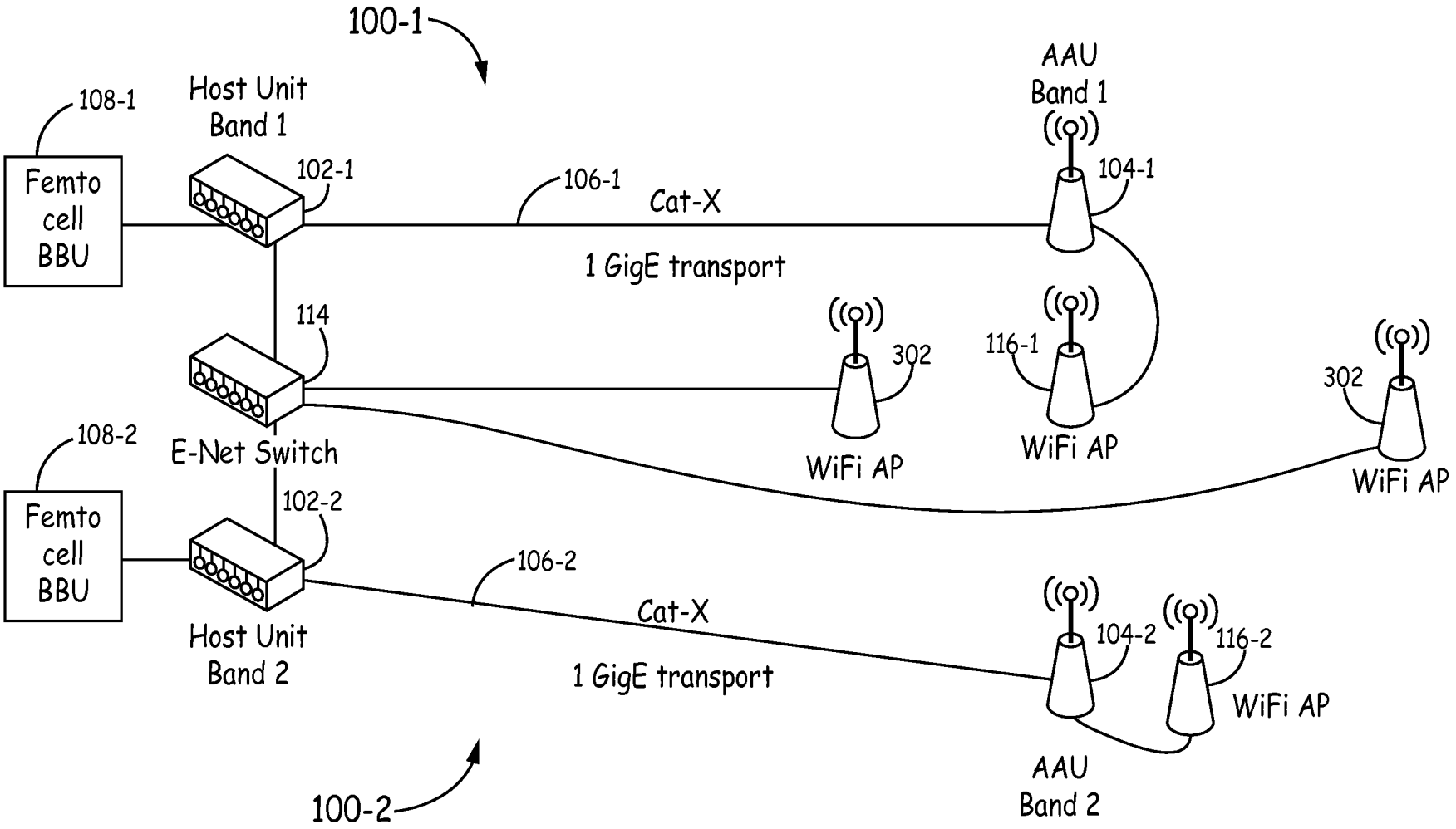
FIG. 3 is a block diagram of an example network including two DASs utilizing respective communication links to transport signals to respective AAUs.

FIG. 3 is an example of a network 300 including two DASs 100-1, 100-2 utilizing respective communication links 106-1, 106-2 to transport signals to respective AAUs 104-1, 104-2. In this example, the host unit 102-1, 102-2 of each DAS 100-1, 100-2 is coupled to a respective RAN node 108-1, 108-2. In this example, each host unit 102-1, 102-2 communicates a respective signal corresponding to a respective cellular RF band with the respective RAN node 108-1, 108-2. Each host unit 102-1, 102-2 also communicates digitized RF data for the respective cellular RF band with a respective AAU 104 coupled to the respective host unit 102-1, 102-2 over the respective communication link 106.

In this example, the host units 102-1, 102-2 are also coupled to a first Ethernet device 114. The host units 102-1, 102-2 are configured to communicate respective Ethernet signals with the first Ethernet device 114. In particular, the first host unit 102-1 is configured to communicate IP formatted data to/from a second Ethernet device 116-1 with the first Ethernet device 114. The first host unit 102-1 is configured to communicate corresponding IP formatted data along with digitized RF data on the first communication link 106-1 toward the first AAU 104-1. The first AAU 104-1 is configured to communicate a wireless RF signal in a first cellular RF band based on the digitized RF data. The first AAU 104-1 is also configured to send an Ethernet signal to the second Ethernet device 116-1 that is coupled to the first AAU 104-2 based on the IP formatted data.

Similarly, the second host unit 102-2 is configured to communicate Ethernet signals corresponding to a third Ethernet device 116-2 with the first Ethernet device 114. The second host unit 102-2 is configured to communicate corresponding IP formatted data along with digitized RF data on the second communication link 106-2 toward the second AAU 104-2. The second AAU 104-2 is configured to communicate a wireless RF signal in a second cellular RF band based on the digitized RF data. The second AAU 104-2 is also configured to send an Ethernet signal to the third Ethernet device 116-2 that is coupled to the second AAU 104-2 based on the IP formatted data.

Although in this example, the first and second DAS 100-1, 100-2 are shown with a respective single communication link 106-1, 106-2, it should be understood that more than one communication link 106 and corresponding AAU 104 and Ethernet device 116 can be coupled to a respective host unit 102 as described above.

As shown, in addition to being coupled to an Ethernet device 116 through the DASs 100-1, 100-2, the first Ethernet device 114 can also be coupled "directly" (i.e., not through a DAS 100-1, 100-2) to one or more other Ethernet devices 302. Such other Ethernet devices 302 can be coupled to the first Ethernet device 114 in any suitable manner (i.e., using respective communication links 106).

Figure 4:
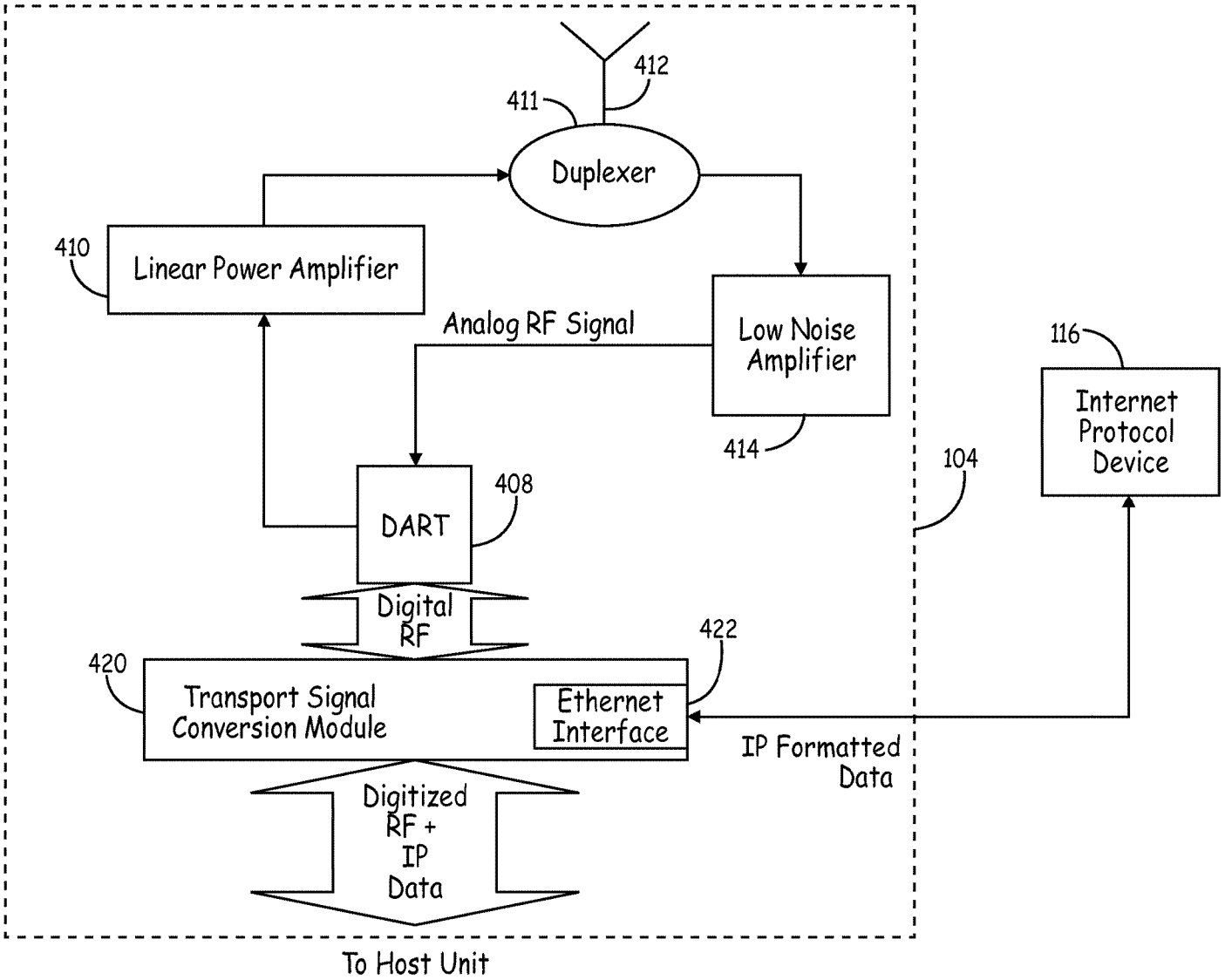
FIG. 4 is a block diagram of an example AAU of FIGS. 1, 2, and 4, coupled to an Ethernet device.

FIG. 4 is a block diagram of an example AAU 104 coupled to a second IP device 116. The AAU 104 includes a transport signal conversion module 420, a digital to analog radio frequency transceiver (DART) module 408, a linear power amplifier 410, antenna 412, a duplexer 411, a low noise amplifier 414 and an Ethernet Interface 422. In one embodiment, transport signal conversion modules and DART modules described herein are realized using discrete RF components, FPGAs, ASICs, digital signal processing (DSP) boards, or similar components.

DART module 408 provides bi-directional conversion between analog RF signals and digital sampled RF for the downlink and uplink transport signals transmitted between host unit 102 and AAU 104. In the uplink, DART module 408 receives an incoming analog RF signal from wireless device 112 and samples the analog RF signal to generate digitized RF data for use by transport signal conversion module 420. Antenna 412 receives the wireless RF signal from wireless device 112 which passes the RF signal to DART module 408 via low noise amplifier 414. In the downlink direction DART module 408 receives digitized RF data from transport signal conversion module 420, up converts the digitized RF data to a broadcast frequency if necessary, and converts the digitized RF data to analog RF for wireless transmission. After a signal is converted to an analog RF signal by DART module 408, the analog RF signal is sent to linear power amplifier 410 for broadcast via antenna 412. Linear power amplifier 410 amplifies the RF signal received from DART module 408 for output through duplexer 411 to antenna 412. In an example, duplexer 411 provides duplexing of the signal which is necessary to connect transmit and receive signals to a common antenna 412. In one embodiment, low noise amplifier 414 is integrated into duplexer 411. In another example, a time division duplex (TDD) switch can be used in place of the duplexer 411 to support TDD protocols.

A DART module 408 in an AAU 104 can be specific for a particular frequency band. For example, in one implementation DART module 408 is designed to transmit 850 MHz cellular transmissions. As another example, in another implementation DART module 408 transmits 1900 MHz PCS signals. Some of the other options for a DART module 408 include, but are not limited to, SMR 800 band, SMR 900 band, PCS full band, EBS/BRS 2600, and the European GSM 900, GSM 1800, and UMTS 2100.

Transport signal conversion module 420 is coupled to the DART module 408. Transport signal conversion module 420 provides bi-directional conversion between a transport signal and digitized RF data. In the uplink direction, transport signal conversion module 420 receives digitized RF data from DART module 408 and sends a transport signal over communication link 106 to host unit 102. In the downlink direction, transport signal conversion module 420 receives a transport signal from host unit 102 and provides digitized RF data to DART module 408.

The AAU 104 also includes an Ethernet interface 422. The Ethernet interface 422 is configured to communicate Ethernet signals with an IP device 116 coupled to the Ethernet interface 422, for example, over a communication link. In one embodiment, Ethernet interface 422 includes a jack for a standard 8 Position 8 Contact (8P8C) modular plug on a communication link and an Ethernet physical layer device.

IP device 116 may include any device designed to network using an Ethernet connection. For example, IP device 116 may comprise a networking devices such a switch, router, and/or wireless access point (for WiFi or WiMAX, for example). In still other implementations, IP device 116 may include any number of other data collection devices such as a surveillance camera, a motion, heat or vibration sensor or a subscriber unit locator. IP device 116 formats data it collects for transmission over an internet protocol (IP) connection and then outputs the data to the transport signal conversion module 420 via Ethernet interface 422 which in turn multiplexes the IP formatted data with the digitized RF data into a transport signal sent to the host unit 102. Transport signal conversion module 420 also adaptive adjusts the number of bits in the transport signal allocated to the digitized RF data and IP formatted data as discussed above. Transport signal conversion module 520 also demultiplexes the IP formatted data from the digitized RF data in received a transport signal from a host unit 102, and adjusts to the adaptive allocation of the bits between digitized RF data and IP formatted data in the transport signal.

Figure 5:
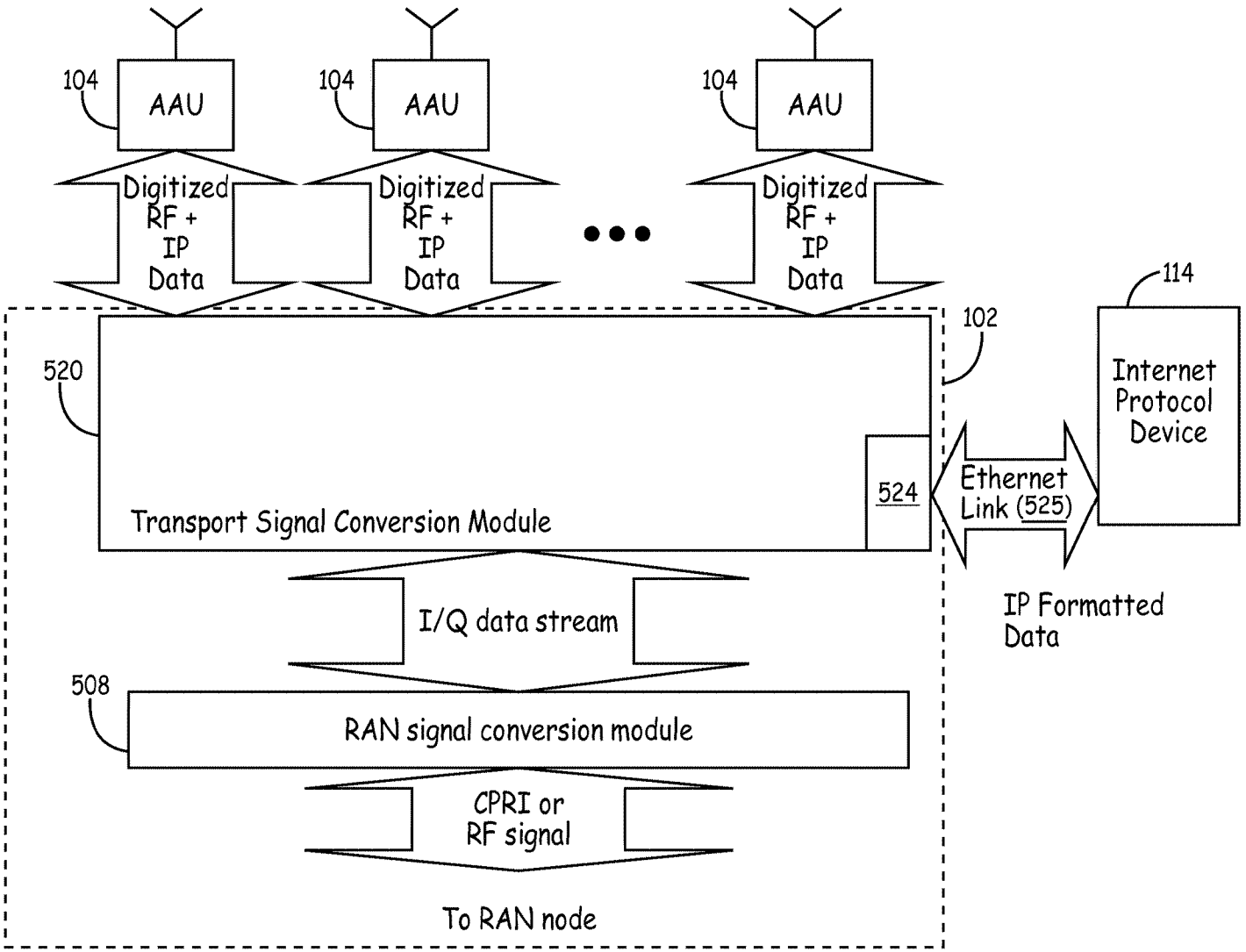
FIG. 5 is a block diagram of an example host unit of FIGS. 1, 2, and 4, coupled to an Ethernet device.

FIG. 5 is a block diagram illustrating an example of a host unit 102 coupled to a first IP device 114. Multiple AAUs 104 can be coupled to host unit 102 over respective communication links 106, as described with respect to FIG. 1, to form a digital DAS. Host unit 102 includes a RAN signal conversion module 508 and a host unit transport signal conversion module 520. RAN signal conversion module 508 provides bi-direction conversion between signals to and from a RAN node 108 and I/Q data streams. Transport signal conversion module 520 provides bi-directional conversion between a transport signal of digitized RF data to and from the AAUs 104, and the I/Q data streams. In the uplink, the transport signal conversion module 520 extracts digitized RF data from one or more transport signals received from one or more AAUs 104, sums the digitized RF data in some examples, and converts the digitized RF data to an I/Q data stream, which is provided to the RAN signal conversion module 508. In the downlink, the transport signal conversion module 520 receives an I/Q data stream from the RAN signal conversion module 508 and converts the I/Q data stream to digitized RF data. The digitized RF data is then multiplexed into a transport signal with IP formatted data and sent to one or more AAUs 104 as discussed above.

The signals between the RAN signal conversion module 508 and a RAN node 108 correspond to the digitized RF data transported to and from the AAU(s) 104 and can take a form appropriate for the RAN node 108. For example, if the RAN node 108 is configured to communicate CPRI signals (i.e., signals conforming to the CPRI specification) with the host unit 102, the RAN signal conversion module 508 can generate a CPRI signal from an I/Q data stream from the transport signal conversion module 520. Similarly in the downlink, the RAN signal conversion module 508 can be configured to receive a CPRI signal from the RAN node 108 and to generate an I/Q data stream therefrom. This I/Q data stream is then provided to the transport signal conversion module 520 for generating digitized RF data and a transport signal as discussed above. Any suitable connector can used to couple the host unit 102 (i.e., RAN interface 508) to the RAN node 108, including an optical connector such as an SFP connector.

If the RAN node 108 is configured to transmit and receive RF signals, the RAN signal conversion module 508 can generate an RF signal from an I/Q data stream and send the RF signal to the RAN node 108. In the downlink, the RAN conversion module 508 is configured to digitize the RF signal from the RAN node 108 with an analog-to-digital converter either directly at RF, or in some embodiments at IF through down conversion. An FPGA, for example, can then be used to generate an I/Q stream which is provided to the transport signal conversion module 520. In the uplink, the RAN conversion module 508 is configured to receive an I/Q stream from the transport signal conversion module 520 and to generate an analog RF signal therefrom with a digital-to-analog converter. The RF signal is sent to the RAN node 108. The RAN conversion module 508 can either directly create the analog RF signal from the I/Q stream or can create an IF signal from the I/Q stream and up-convert the IF signal to an RF signal. Any appropriate RF connectors can be used to connect to a cable for communicating the RF signals with the RAN node 108.

Host unit 102 further includes an Ethernet port interface 524 for coupling the first IP device 114 to transport signal conversion module 520 via an Ethernet link 525. Ethernet link 525 may include a local area network (LAN), wide area network (WAN) having at least one network switch for routing data between interface 524 and IP device 114. Alternatively, IP device 114 may be an internet switch, router, or any of the IP devices discussed above with respect to IP device 116. Ethernet interface 524 can include one or more jacks for an 8 Position 8 Contact (8P8C) modular plug on a communication link. The transport signal conversion module 520 multiplexes the IP formatted data with the digitized RF data into one or more transport signals sent to one or more AAUs 104. Transport signal conversion module 420 also adaptively adjusts the number of bits in the transport signal(s) allocated to the digitized RF data and IP formatted data as discussed above. Transport signal conversion module 520 also de-multiplexes the IP formatted data from the digitized RF data in received transport signals from the one or more AAUs 104, and adjusts to the adaptive allocation of the bits between digitized RF data and IP formatted data in the transport signal.

In an example, the host unit 102 includes multiple jacks in the Ethernet interface 524 for connecting with corresponding plugs on respective communication link to send/receive signals with respective first Ethernet devices 114. Each such jack in the Ethernet interface 524 can connect to a respective communication link that can transport Ethernet signals between the transport signal conversion module 520 in the host unit 102 and a respective first Ethernet device 114. Since each such jack can be connected to a different first Ethernet device 114, distinct IP formatted data can be communicated through each such jack. Moreover, as discussed above, multiple second Ethernet devices 116 can be coupled to respective AAUs 104 which are coupled to the AAU interface 104 via respective communication links 106. Accordingly, distinct IP formatted data can also be communicated over each communication link 106 to each distinct second Ethernet device 116.

To enable such distinct IP formatted data to be communicated between multiple first Ethernet devices 114 and multiple second Ethernet devices 116, the host unit 102 can individually distribute the IP formatted data received from the first Ethernet devices 114 to a corresponding communication link 106 for transport to a respective AAU 104. In particular, the host unit 102 can be configured to distribute the IP formatted data according to the destination device (e.g., second Ethernet device 116) of the IP formatted data. Distributing the IP formatted data includes multiplexing the IP formatted data to be sent to a respective second Ethernet device 116 into the respective transport signal for that second Ethernet device 116 along with the digitized RF data for the AAU 104 to which the respective second Ethernet device 116 is coupled. This multiplexing can take place on an individual basis for each communication link 106/AAU 104 such that distinct IP formatted data can be multiplexed into different transport signals to a respective AAU 104/second Ethernet device 116. Distributing the IP formatted data also include de-multiplexing the IP formatted data from each respective transport signal and sending the IP formatted data over a jack in the Ethernet interface 524. This de-multiplexing can also take place on an individual basis for each communication link 106/AAU 104 such that distinct IP formatted data can be extracted from different transport signals from a respective AAU 104/second Ethernet device 116.

In an example, the host unit 102 can be configured to have a static relationship between the multiple jacks in the Ethernet interface 524 and the multiple communication links 106 over which signals are sent/received from the AAUs 104. For example, a first jack in the Ethernet interface 524 can be coupled by the host unit 102 to a first communication link 106 over which signals are sent/received with a first AAU 104, such that IP formatted data received through the first jack is sent over the first communication link 106 and IP formatted data received over the first communication link 106 is sent over the first jack. In such an example, a second jack in the Ethernet interface 524 can be coupled by the host unit 102 to a second communication link 106 over which signals are sent/received with a second AAU 104, such that IP formatted data received through the second jack is sent over the second communication link 106 and IP formatted data received over the second communication link 106 is sent over the second jack. Such a one-to-one relationship can exist for each jack in the Ethernet interface 524 and a paired communication link 106 over which signals are sent/received with an AAU 104. In other examples, the relationship between a jack in the Ethernet interface 524 and a paired communication link 106 over which signals are sent/received with an AAU 104 is other than one-to-one, and the host unit 102 distributes the IP formatted data accordingly.

In exemplary embodiments, cellular RF signals may utilize various wireless protocols and in various bands of frequency spectrum. For example, the cellular RF signals may include, but are not limited to, licensed RF bands, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 2100 MHz Advanced Wireless Services (AWS), 700 MHz uC/ABC services, two way paging services, video services, Public Safety (PS) services at 450 MHz, 900 MHz and 1800 MHz Global System for Mobile Communications (GSM), 2100 MHz Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), or other appropriate communication services. The system described herein are capable of transporting both Single Input Single Output (SISO) and Multiple Input Multiple Output (MIMO) services at any of the frequencies described above. The systems described herein can support any combination of SISO and MIMO signals across various bands of frequency spectrum. In some example embodiments, the systems described herein may provide MIMO streams for WiMAX, LTE, and HSPA services while only providing SISO streams for other services. Other combinations of MIMO and SISO services are used in other embodiments.

In examples, any of the processors described above may include or function with software programs, firmware or other computer readable instructions for carrying out various methods, process tasks, calculations, and control functions, used in the digital processing functionality described herein. These instructions are typically stored on any appropriate computer readable medium used for storage of computer readable instructions or data structures. The computer readable medium can be implemented as any available media that can be accessed by a general purpose processor (GPP) or special purpose computer or processor (such as a field-programmable gate array (FPGA), application-specific integrated circuit (ASIC) or other integrated circuit), or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless like.

Although the host unit 102 and at least one AAU 104 are described herein as being communicatively coupled together over a communication link 104, in other example, the host unit 102 and the at least one AAU 102 are coupled together using one or more other cables including coaxial cable, fiber, or a combination of two or more of twisted pair, coax, and fiber. In further examples, host unit 102 and AAU(s) 104 can be interconnected via wireless technology such as, but not limited to, microwave and e-band communication.

Example Embodiments

Example 1 includes a distributed antenna system (DAS) comprising: a host unit; and an active antenna unit (AAU) communicatively coupled to the host unit over a communication link, the AAU configured to wirelessly communicate with one or more wireless devices, wherein the AAU receives uplink radio frequency (RF) signals from the one or more wireless devices and samples the uplink RF signals to generate first digitized RF data, the AAU including an Ethernet interface for receiving first Internet Protocol (IP) formatted data from a first IP device coupled to the Ethernet interface; wherein the AAU transports the first digitized RF data and the first IP formatted data over a first transport signal to the host unit, the first transport signal including a first plurality of bits, wherein the AAU is configured to adaptively adjust the number of bits that are allocated to the first digitized RF data and the number of bits that are allocated to the first IP formatted data.

Example 2 includes the DAS of Example 1, wherein the first transport signal includes a first plurality of communication frames, wherein the AAU is configured to adaptively adjust the number of bits that are allocated to the first digitized RF data in a communication frame and the number of bits that are allocated to the first IP formatted data in a communication frame.

Example 3 includes the DAS of Example 2, wherein the AAU is configured to adaptively adjust the allocation of bits on a frame-by-frame basis.

Example 4 includes the DAS of any of Examples 1-3, wherein the host unit is configured to receive the first transport signal, wherein the host unit includes: a radio access network interface to send to radio access network node a first signal corresponding to the first digitized RF data from the AAU; and an Ethernet interface to send the first IP formatted data to a second IP device coupled to the Ethernet interface of the host unit.

Example 5 includes the DAS of Example 4, wherein the host unit is configured to receive from the radio access network node a second signal corresponding to a downlink RF signal, wherein the host unit is configured to receive second IP formatted data from the second IP device; wherein the host unit transports second digitized RF data corresponding to the downlink RF signal and the second IP formatted data over a second transport signal to the AAU, the second transport signal including a second plurality of bits, wherein the host unit is configured to adaptively adjust the number of bits that are allocated to the second digitized RF data and the number of bits that are allocated to the second IP formatted data.

Example 6 includes the DAS of Example 5, wherein the second transport signal includes a second plurality of communication frames, wherein the host unit is configured to adaptively adjust the number of bits that are allocated to the second digitized RF data in a communication frame and the number of bits that are allocated to the second IP formatted data in a communication frame.

Example 7 includes the DAS of Example 6, wherein the host unit is configured to adaptively adjust the allocation of bits on a frame-by-frame basis.

Example 8 includes the DAS of any of Examples 5-7, wherein the first IP formatted data received at the AAU from the first IP device and the second IP formatted data received at the host unit from the second IP device are formatted into Ethernet frames in compliance with an IEEE Example 802.3 standard.

Example 9A includes the DAS of any of Examples 5-8, wherein the first and second signals communicated with the radio access network node comply with the common public radio interface (CPRI) specification.

Example 9B includes the DAS of any of Examples 5-8, wherein the first and second signals communicated with the radio access network node are analog RF signals in a cellular RF band.

Example 10 includes the DAS of any of Examples 5-9, wherein the AAU is configured to receive the second transport signal, to transmit a downlink wireless RF signal based on the second digitized RF data, and to send the second IP data to the first IP device.

Example 11 includes the DAS of any of Examples 1-10, wherein the radio access network node is one of a base station, a base transceiver station, baseband unit, or an internet protocol (IP) gateway.

Example 12 includes the DAS of any of Examples 1-11, wherein the first and second digitized RF data includes one or more of baseband samples, intermediate frequency (IF) samples, and RF samples.

Example 13 includes the DAS of any of Examples 1-12, wherein the first IP device and the second IP device are one of an Ethernet router, Ethernet switch, Ethernet hub, a personal computing device having an Ethernet network interface, or a wireless access point.

Example 14 includes the DAS of any of Examples 1-13, wherein the communication link is a cable in compliance with one of the category 5, category 5e, category 6, or category 6a specifications.

Example 15 includes the DAS of any of Examples 1-14, wherein the communication link is a coaxial cable or an optical fiber.

Example 16 includes a method for distributing signals in a distributed antenna system (DAS), the method comprising: receiving, at an active antenna unit (AAU), first internet protocol (IP) formatted data from a first IP device coupled to the AAU; sampling wireless radio frequency (RF) signals received at the AAU to produce first digitized RF data; generating, at the AAU, a first transport signal for transport of the first IP formatted data and the first digitized RF data to a host unit of the DAS, the first transport signal including a first plurality of bits, wherein generating the first transport signal includes adaptively adjusting the number of bits that are allocated to the first IP formatted data and the number of bits that are allocated to the first digitized RF data; and sending the first transport signal to the host unit over a communication link.

Example 17 includes the method of Example 16, wherein adaptively adjusting includes adaptively adjusting the number of bits that are allocated to the first digitized RF data in a communication frame and the number of bits that are allocated to the first IP formatted data in a communication frame.

Example 18 includes the method of Example 17, wherein adaptively adjusting includes adaptively adjust the allocation of bits on a frame-by-frame basis.

Example 19 includes the method of any of Examples 16-18, comprising: receiving, at the host unit, the first transport signal from the AAU; sending, from the host unit, a first signal corresponding to the first digitized RF data to a radio access network node coupled to the host unit; and sending, from the host unit, the IP formatted data to a second IP device coupled to the host unit.

Example 20 includes the method of Example 19, comprising: receiving, at the host unit, second IP formatted data from the second IP device; receiving, at the host unit, a second signal corresponding to a downlink RF signal; generating, at the host unit, a second transport signal for transporting the second IP formatted data and second digitized RF data to the AAU, the second digitized RF data corresponding to the downlink RF signal, the second transport signal including a second plurality of bits, wherein generating the second transport signal includes adaptively adjusting the number of bits that are allocated to the second IP formatted data and the second digitized RF data; and sending the second transport signal to the AAU.

Example 21 includes the method of Examples 20A and 20B, wherein adaptively adjusting the number of bits includes adaptively adjusting the number of bits that are allocated to the second digitized RF data in a communication frame and the number of bits that are allocated to the second IP formatted data in a communication frame.

Example 22 includes the method of Example 21, wherein adaptively adjusting includes adaptively adjusting the allocation of bits on a frame-by-frame basis.

Example 23 includes the method of any of Examples 20-22, wherein the first IP formatted data received at the AAU from the first IP device and the second IP formatted data received at the host unit from the second IP device are formatted into Ethernet frames in compliance with an IEEE Example 802.3 standard.

Example 24 includes the method of any of Examples 20-23, wherein the first and second signals communicated with the radio access network node comply with the common public radio interface (CPRI) specification.

Example 25 includes the method of any of Examples 20-24, comprising: receiving, at the AAU, the second transport signal; transmitting, from the AAU, a downlink wireless RF signal based on the second digitized RF data; and sending, from the AAU, the second IP data to the first IP device.

Example 26A includes the method of any of Examples 16-25, wherein the first and second digitized RF data includes one or more of baseband samples, intermediate frequency (IF) samples, and RF samples.

Example 26B includes the method of any of Examples 16-19, comprising: receiving at a second AAU, second IP formatted data from a second IP device coupled to the second AAU; sampling wireless radio frequency (RF) signals received at the second AAU to produce second digitized RF data; generating, at the second AAU, a second transport signal for transport of the second IP formatted data and the second digitized RF data to the host unit, the second transport signal including a second plurality of bits, wherein generating the first transport signal includes adaptively adjusting the number of bits that are allocated to the second IP formatted data and the number of bits that are allocated to the second digitized RF data; sending the second transport signal toward the host unit over a communication link; summing the first digitized RF data with the second digitized RF data to generate summed digitized RF data; sending, from the host unit, a signal corresponding to the summed digitized RF data to a radio access network node coupled to the host unit; and sending, from the host unit, the first IP formatted data and the second IP formatted data to one or more second IP devices coupled to the host unit.

Example 27 includes an active antenna unit (AAU) for a distributed antenna system (DAS), the AAU comprising: a radio frequency (RF) transceiver configured to wirelessly communicate with one or more wireless devices, wherein the RF transceiver receives an uplink RF signals from the one or more wireless devices; a transport signal conversion module configured to sample the uplink RF signals to generate first digitized RF data; an Ethernet interface configured to communicate Ethernet signals with an IP device coupled to the Ethernet interface, wherein the Ethernet interface receives first IP formatted data from the IP device; and a host interface configured to be coupled to a communication link, wherein the transport signal conversion module transports the first digitized RF data and the first IP formatted data over the communication link in a first transport signal to a host unit, the first transport signal including a first plurality of bits, wherein the transport signal conversion module is configured to adaptively adjust the number of bits that are allocated to the first digitized RF data and the number of bits that are allocated to the first IP formatted data.

Example 28 includes the AAU of Example 27, wherein the first transport signal includes a first plurality of communication frames, wherein the transport signal conversion module is configured to adaptively adjust the number of bits that are allocated to the first digitized RF data in a communication frame and the number of bits that are allocated to the first IP formatted data in a communication frame.

Example 29 includes the AAU of Example 28, wherein the transport signal conversion module is configured to adaptively adjust the number of bits on a frame-by-frame basis.

Example 30 includes the AAU of any of Examples 27-29, wherein the transport signal conversion module is configured to receive a second transport signal over the communication link from the host unit, the second transport signal including second digitized RF data corresponding to a downlink RF signal and second IP formatted data, the second transport signal includes a second plurality of bits, wherein the number of bits in the second transport signal that are allocated to the second digitized RF data and the number of bits that are allocated to the second IP formatted data are adaptively adjusted; wherein the transport signal conversion module is configured to adaptively adjust to the allocation of bits to transmit a downlink wireless RF signal based on the second digitized RF data and to send the second IP data to the IP device.

Example 31 includes the AAU of any of Examples 27-30, wherein the first IP formatted data received from the IP device and the second IP formatted data sent to the IP device are formatted into Ethernet frames in compliance with an IEEE Example 802.3 standard.

Example 32 includes the AAU of any of Examples 27-31, wherein the IP device is one of an Ethernet router, Ethernet switch, Ethernet hub, a personal computing device having an Ethernet network interface, or a wireless access point.

Example 33 includes the AAU of any of Examples 27-32, wherein the communication link is a cable in compliance with one of the category 5, category 5e, category 6, or category 6a specifications.

Example 34 includes a host unit for a distributed antenna system (DAS), the host unit comprising: a radio access network interface to communicate signals corresponding to wireless RF signals with a radio access network node, wherein the radio access network interface receives a first signal corresponding to a downlink RF signal, an Ethernet interface to communicate Ethernet signals with an IP device coupled to the Ethernet interface, wherein the Ethernet interface receives first IP formatted data from the IP device; an AAU interface configured to be coupled to a communication link; and a transport signal conversion module configured to transport first digitized RF data corresponding to the first signal from the radio access network node and the first IP formatted data over the communication link in a first transport signal to an AAU, the first transport signal including a first plurality of bits, wherein the transport signal conversion module is configured to adaptively adjust the number of bits that are allocated to the first digitized RF data and the number of bits that are allocated to the first IP formatted data.

Example 35 includes the host unit of Example 34, wherein the first transport signal includes a plurality of communication frames, wherein the transport signal conversion module is configured to adaptively adjust the number of bits that are allocated to the second digitized RF data in a communication frame and the number of bits that are allocated to the second IP formatted data in a communication frame.

Example 36 includes the host unit of Example 35, wherein the transport signal conversion module is configured to adaptively adjust the number of bits on a frame-by-frame basis.

Example 37 includes the host unit of Example 36, wherein the transport signal conversion module is configured to receive a second transport signal over the communication link from the AAU, the second transport signal including second digitized RF data corresponding to an uplink RF signal and second IP formatted data, the second transport signal includes a second plurality of bits, wherein the number of bits in the second transport signal that are allocated to the second digitized RF data and the number of bits that are allocated to the second IP formatted data are adaptively adjusted; wherein the transport signal conversion module is configured to adaptively adjust to the allocation of bits to send a second signal based on the second digitized RF data to the radio access network node and to send the second IP data to the IP device.

Example 38 includes the host unit of any of Examples 34-37, wherein the first IP formatted data received from the IP device and the second IP formatted data sent to the IP device are formatted into Ethernet frames in compliance with an IEEE Example 802.3 standard.

Example 39 includes the host unit of any of Examples 34-38, wherein the first and second digitized RF data includes one or more of baseband samples, intermediate frequency (IF) samples, and RF samples.

Example 40 includes the host unit of any of Examples 34-39, wherein the IP device is one of an Ethernet router, Ethernet switch, Ethernet hub, a personal computing device having an Ethernet network interface, or a wireless access point.

Example 41 includes the host unit of any of Examples 34-40, wherein the communication link is a cable in compliance with one of the category 5, category 5e, category 6, or category 6a specifications.

What is claimed is:

1. A distributed antenna system (DAS) comprising:

a host unit; and an active antenna unit (AAU) communicatively coupled to the host unit over a communication link, the AAU configured to wirelessly communicate with one or more wireless devices, wherein the AAU receives uplink radio frequency (RF) signals from the one or more wireless devices and samples the uplink RF signals to generate first digitized RF data, the AAU including an Ethernet interface for receiving first Internet Protocol (IP) formatted data from a first IP device coupled to the Ethernet interface;

wherein the AAU transports the first digitized RF data and the first IP formatted data over a first transport signal to the host unit, the first transport signal including a first plurality of bits, wherein the AAU is configured to adaptively adjust the number of bits that are allocated to the first digitized RF data and the number of bits that are allocated to the first IP formatted data based on at least one of:

a variation in an amount of digitized RF data and/or IP formatted data transported over time;

an amount of usage of digitized RF data;

an amount of usage of IP formatted data; or a prioritization scheme that either prioritizes digitized RF data over IP formatted data or prioritizes IP formatted data over digitized RF data;

wherein the AAU is configured to provide an indication, to the host unit, of the number of bits in the first transport signal that are allocated to the first digitized RF data and the number of bits in the first transport signal that are allocated to the first IP formatted data.

2. The DAS of claim 1, wherein the first transport signal includes a first plurality of communication frames, wherein the AAU is configured to adaptively adjust the number of bits that are allocated to the first digitized RF data in a communication frame and the number of bits that are allocated to the first IP formatted data in a communication frame, wherein a total number of bits of a communication frame is fixed.

3. The DAS of claim 2, wherein the AAU is configured to adaptively adjust the allocation of bits on a frame-by-frame basis.

4. The DAS of claim 1, wherein the host unit is configured to receive the first transport signal, wherein the host unit includes:

a radio access network interface to send to a radio access network node a first signal corresponding to the first digitized RF data from the AAU; and an Ethernet interface to send the first IP formatted data to a second IP device coupled to the Ethernet interface of the host unit.

5. The DAS of claim 4, wherein the host unit is configured to receive from the radio access network node a second signal corresponding to a downlink RF signal, wherein the host unit is configured to receive second IP formatted data from the second IP device;

wherein the host unit transports second digitized RF data corresponding to the downlink RF signal and the second IP formatted data over a second transport signal to the AAU, the second transport signal including a second plurality of bits, wherein the host unit is configured to adaptively adjust the number of bits that are allocated to the second digitized RF data and the number of bits that are allocated to the second IP formatted data.

6. The DAS of claim 5, wherein the second transport signal includes a second plurality of communication frames, wherein the host unit is configured to adaptively adjust the number of bits that are allocated to the second digitized RF data in a communication frame and the number of bits that are allocated to the second IP formatted data in a communication frame.

7. The DAS of claim 6, wherein the host unit is configured to adaptively adjust the allocation of bits on a frame-by-frame basis.

8. The DAS of claim 5, wherein the first IP formatted data received at the AAU from the first IP device and the second IP formatted data received at the host unit from the second IP device are formatted into Ethernet frames in compliance with an IEEE 802.3 standard.

9. The DAS of claim 5, wherein the first and second signals communicated with the radio access network node comply with the common public radio interface (CPRI) specification.

10. The DAS of claim 5, wherein the first and second signals communicated with the radio access network node are analog RF signals in a cellular RF band.

11. The DAS of claim 5, wherein the AAU is configured to receive the second transport signal, to transmit a downlink wireless RF signal based on the second digitized RF data, and to send the second IP data to the first IP device.

12. The DAS of claim 4, wherein the radio access network node is one of a base station, a base transceiver station, baseband unit, or an internet protocol (IP) gateway.

13. The DAS of claim 5, wherein the first and second digitized RF data includes one or more of baseband samples, intermediate frequency (IF) samples, and RF samples.

14. The DAS of claim 4, wherein the first IP device and the second IP device are one of an Ethernet router, Ethernet switch, Ethernet hub, a personal computing device having an Ethernet network interface, or a wireless access point.

15. The DAS of claim 1, wherein the communication link is a cable in compliance with one of the category 5, category 5e, category 6, or category 6a specifications.

16. The DAS of claim 1, wherein the communication link is a coaxial cable or an optical fiber.

17. A method for distributing signals in a distributed antenna system (DAS), the method comprising:

receiving, at an active antenna unit (AAU), first internet protocol (IP) formatted data from a first IP device coupled to the AAU;

sampling wireless radio frequency (RF) signals received at the AAU to produce first digitized RF data;

generating, at the AAU, a first transport signal for transport of the first IP formatted data and the first digitized RF data to a host unit of the DAS, the first transport signal including a first plurality of bits, wherein generating the first transport signal includes adaptively adjusting the number of bits that are allocated to the first IP formatted data and the number of bits that are allocated to the first digitized RF data based on at least one of:

a variation in an amount of digitized RF data and/or IP formatted data transported over time;

an amount of usage of digitized RF data;

an amount of usage of IP formatted data; or a prioritization scheme that either prioritizes digitized RF data over IP formatted data or prioritizes IP formatted data over digitized RF data;

sending the first transport signal toward the host unit over a communication link; and providing an indication, from the AAU to the host unit, of the number of bits in the first transport signal that are allocated to the first digitized RF data and the number of bits in the first transport signal that are allocated to the first IP formatted data.

18. The method of claim 17, wherein adaptively adjusting includes adaptively adjusting the number of bits that are allocated to the first digitized RF data in a communication frame and the number of bits that are allocated to the first IP formatted data in a communication frame, wherein a total number of bits of a communication frame is fixed.

19. The method of claim 18, wherein adaptively adjusting includes adaptively adjusting the allocation of bits on a frame-by-frame basis.

20. The method of claim 17, comprising:

receiving, at the host unit, the first transport signal from the AAU;

sending, from the host unit, a first signal corresponding to the first digitized RF data to a radio access network node coupled to the host unit; and sending, from the host unit, the first IP formatted data to a second IP device coupled to the host unit.

21. The method of claim 20, comprising:

receiving, at the host unit, second IP formatted data from the second IP device;

receiving, at the host unit, a second signal corresponding to a downlink RF signal;

generating, at the host unit, a second transport signal for transporting the second IP formatted data and second digitized RF data to the AAU, the second digitized RF data corresponding to the downlink RF signal, the second transport signal including a second plurality of bits, wherein generating the second transport signal includes adaptively adjusting the number of bits that are allocated to the second IP formatted data and the second digitized RF data; and sending the second transport signal to the AAU.

22. The method of claim 21, wherein adaptively adjusting the number of bits includes adaptively adjusting the number of bits that are allocated to the second digitized RF data in a communication frame and the number of bits that are allocated to the second IP formatted data in a communication frame.

23. The method of claim 22, wherein adaptively adjusting includes adaptively adjusting the allocation of bits on a frame-by-frame basis.

24. The method of claim 21, wherein the first IP formatted data received at the AAU from the first IP device and the second IP formatted data received at the host unit from the second IP device are formatted into Ethernet frames in compliance with an IEEE 802.3 standard.

25. The method of claim 21, wherein the first and second signals communicated with the radio access network node comply with the common public radio interface (CPRI) specification.

26. The method of claim 21, comprising:

receiving, at the AAU, the second transport signal;

transmitting, from the AAU, a downlink wireless RF signal based on the second digitized RF data; and sending, from the AAU, the second IP data to the first IP device.

27. The method of claim 21, wherein the first and second digitized RF data includes one or more of baseband samples, intermediate frequency (IF) samples, and RF samples.

28. The method of claim 17, comprising:

receiving at a second AAU, second IP formatted data from a second IP device coupled to the second AAU;

sampling wireless radio frequency (RF) signals received at the second AAU to produce second digitized RF data;

generating, at the second AAU, a second transport signal for transport of the second IP formatted data and the second digitized RF data to the host unit, the second transport signal including a second plurality of bits, wherein generating the second transport signal includes adaptively adjusting the number of bits that are allocated to the second IP formatted data and the number of bits that are allocated to the second digitized RF data;

sending the second transport signal toward the host unit over a communication link;

summing the first digitized RF data with the second digitized RF data to generate summed digitized RF data;

sending, from the host unit, a signal corresponding to the summed digitized RF data to a radio access network node coupled to the host unit; and sending, from the host unit, the first IP formatted data and the second IP formatted data to one or more second IP devices coupled to the host unit.

29. The method of claim 28, wherein summing includes summing at the host unit.

30. The method of claim 28, wherein summing includes summing at an intermediate unit and sending a transport signal including the summed digitized RF data from the intermediate unit to the host unit.

31. An active antenna unit (AAU) for a distributed antenna system (DAS), the AAU comprising:

a radio frequency (RF) transceiver configured to wirelessly communicate with one or more wireless devices, wherein the RF transceiver receives an uplink RF signals from the one or more wireless devices;

a transport signal conversion circuit configured to sample the uplink RF signals to generate first digitized RF data;

an Ethernet interface configured to communicate Ethernet signals with an IP device coupled to the Ethernet interface, wherein the Ethernet interface receives first IP formatted data from the IP device; and a host interface configured to be coupled to a communication link, wherein the transport signal conversion circuit transports the first digitized RF data and the first IP formatted data over the communication link in a first transport signal to a host unit, the first transport signal including a first plurality of bits, wherein the transport signal conversion circuit is configured to adaptively adjust the number of bits that are allocated to the first digitized RF data and the number of bits that are allocated to the first IP formatted data based on at least one of:

a variation in an amount of digitized RF data and/or IP formatted data transported over time;

an amount of usage of digitized RF data;

an amount of usage of IP formatted data; or a prioritization scheme that either prioritizes digitized RF data over IP formatted data or prioritizes IP formatted data over digitized RF data;

wherein the AAU is configured to provide an indication, to the host unit, of the number of bits in the first transport signal that are allocated to the first digitized RF data and the number of bits in the first transport signal that are allocated to the first IP formatted data.

32. The AAU of claim 31, wherein the first transport signal includes a first plurality of communication frames, wherein the transport signal conversion circuit is configured to adaptively adjust the number of bits that are allocated to the first digitized RF data in a communication frame and the number of bits that are allocated to the first IP formatted data in a communication frame, wherein a total number of bits of a communication frame is fixed.

33. The AAU of claim 32, wherein the transport signal conversion circuit is configured to adaptively adjust the allocation of bits on a frame-by-frame basis.

34. The AAU of claim 31, wherein the transport signal conversion circuit is configured to receive a second transport signal over the communication link from the host unit, the second transport signal including second digitized RF data corresponding to a downlink RF signal and second IP formatted data, the second transport signal includes a second plurality of bits, wherein the number of bits in the second transport signal that are allocated to the second digitized RF data and the number of bits that are allocated to the second IP formatted data are adaptively adjusted;

wherein the transport signal conversion circuit is configured to adaptively adjust to the allocation of bits to transmit a downlink wireless RF signal based on the second digitized RF data and to send the second IP data to the IP device.

35. The AAU of claim 34, wherein the first IP formatted data received from the IP device and the second IP formatted data sent to the IP device are formatted into Ethernet frames in compliance with an IEEE 802.3 standard.

36. The AAU of claim 31, wherein the IP device is one of an Ethernet router, Ethernet switch, Ethernet hub, a personal computing device having an Ethernet network interface, or a wireless access point.

37. The AAU of claim 31, wherein the communication link is a cable in compliance with one of the category 5, category 5e, category 6, or category 6a specifications.

38. A host unit for a distributed antenna system (DAS), the host unit comprising:

a radio access network interface to communicate signals corresponding to wireless RF signals with a radio access network node, wherein the radio access network interface receives a first signal corresponding to a downlink RF signal, an Ethernet interface to communicate Ethernet signals with an IP device coupled to the Ethernet interface, wherein the Ethernet interface receives first IP formatted data from the IP device;

an AAU interface configured to be coupled to a communication link; and a transport signal conversion circuit configured to transport first digitized RF data corresponding to the first signal from the radio access network node and the first IP formatted data over the communication link in a first transport signal to an AAU, the first transport signal including a first plurality of bits, wherein the transport signal conversion circuit is configured to adaptively adjust the number of bits that are allocated to the first digitized RF data and the number of bits that are allocated to the first IP formatted data based on at least one of:

a variation in an amount of digitized RF data and/or IP formatted data transported over time;

an amount of usage of digitized RF data;

an amount of usage of IP formatted data; or a prioritization scheme that either prioritizes digitized RF data over IP formatted data or prioritizes IP formatted data over digitized RF data;

wherein the transport signal conversion circuit is configured to provide an indication, to the AAU, of the number of bits in the first transport signal that are allocated to the first digitized RF data and the number of bits in the first transport signal that are allocated to the first IP formatted data.

39. The host unit of claim 38, wherein the first transport signal includes a plurality of communication frames, wherein the transport signal conversion circuit is configured to adaptively adjust the number of bits that are allocated to the first digitized RF data in a communication frame and the number of bits that are allocated to the first IP formatted data in a communication frame, wherein a total number of bits of a communication frame is fixed.

40. The host unit of claim 39, wherein the transport signal conversion circuit is configured to adaptively adjust the allocation of bits on a frame-by-frame basis.

41. The host unit of claim 40, wherein the transport signal conversion circuit is configured to receive a second transport signal over the communication link from the AAU, the second transport signal including second digitized RF data corresponding to an uplink RF signal and second IP formatted data, the second transport signal includes a second plurality of bits, wherein the number of bits in the second transport signal that are allocated to the second digitized RF data and the number of bits that are allocated to the second IP formatted data are adaptively adjusted;

wherein the transport signal conversion circuit is configured to adaptively adjust to the allocation of bits to send a second signal based on the second digitized RF data to the radio access network node and to send the second IP data to the IP device.

42. The host unit of claim 41, wherein the first IP formatted data received from the IP device and the second IP formatted data sent to the IP device are formatted into Ethernet frames in compliance with an IEEE 802.3 standard.

43. The host unit of claim 41, wherein the first and second digitized RF data includes one or more of baseband samples, intermediate frequency (IF) samples, and RF samples.

44. The host unit of claim 38, wherein the IP device is one of an Ethernet router, Ethernet switch, Ethernet hub, a personal computing device having an Ethernet network interface, or a wireless access point.

45. The host unit of claim 38, wherein the communication link is a cable in compliance with one of the category 5, category 5e, category 6, or category 6a specifications.

*46. A system, comprising:*

*a first unit communicatively coupled to a second unit that is located remotely from the first unit, wherein the first unit includes:*

*a radio access network interface to communicate signals corresponding to wireless radio frequency (RF) signals with a radio access network node, wherein the radio access network interface receives a signal corresponding to a downlink RF signal,*

*an Ethernet interface to communicate Ethernet signals with an Ethernet device coupled to the Ethernet interface, wherein the Ethernet interface receives data from the Ethernet device;*

*an interface configured to be coupled to a communication link; and*

*a transport signal conversion circuit configured to transport digitized RF data corresponding to the signal from the radio access network node and the data from the Ethernet device over the communication link in a transport signal to the second unit, the transport signal including a plurality of bits;*

*wherein the system is configured to adaptively adjust the number of bits that are allocated to the digitized RF data and the number of bits that are allocated to the data from the Ethernet device based on at least one of:*

*a variation in an amount of digitized RF data and/or data from the Ethernet device transported over time;*

*an amount of usage of digitized RF data;*

*an amount of usage of data from the Ethernet device; or*

*a prioritization scheme that either prioritizes digitized RF data over data from the Ethernet device or prioritizes data from the Ethernet device over digitized RF data;*

*wherein the system is configured to provide an indication, to the second unit, of the number of bits in the transport signal that are allocated to the digitized RF data and the number of bits in the transport signal that are allocated to the data from the Ethernet device.*

*47. The system of claim 46, wherein the system is configured to adaptively adjust the number of bits that are allocated to the digitized RF data and the number of bits that are allocated to the data from the Ethernet device such that bandwidth allocated to digitized RF data and bandwidth allocated to data from the Ethernet device can change over time.*

*48. The system of claim 46, wherein the system is configured to generate wireless communication signals in a licensed RF band using the data from the Ethernet device.*

*49. A system; comprising:*

*a first unit and a second unit communicatively coupled to the first unit using one or more Ethernet cables, wherein the one or more Ethernet cables include a plurality of Ethernet cables coupled in series between the first unit and the second unit, wherein the first unit includes:*

*a radio access network interface to communicate signals corresponding to wireless RF signals with a radio access network node, wherein the radio access network interface receives a signal corresponding to a downlink RF signal,*

*an Ethernet interface to communicate Ethernet signals with an Ethernet device coupled to the Ethernet interface, wherein the Ethernet interface receives data from the Ethernet device;*

*an interface configured to be coupled to at least one of the one or more Ethernet cables; and*

*a transport signal conversion circuit configured to transport digitized RF data corresponding to the signal from the radio access network node and the data from the Ethernet device over at least one of the one or more Ethernet cables in a transport signal to the second unit, the transport signal including a plurality of bits;*

*wherein the system is configured to adaptively adjust the number of bits that are allocated to the digitized RF data and the number of bits that are allocated to the data from the Ethernet device;*

*wherein the system is configured to provide an indication, to the second unit, of the number of bits in the transport signal that are allocated to the digitized RF data and the number of bits in the transport signal that are allocated to the data from the Ethernet device.*

*50. The system of claim 49, further comprising a third unit communicatively coupled between the first unit and the second unit, wherein the one or more Ethernet cables include at least one first Ethernet cable coupled between the first unit and the third unit, wherein the one or more Ethernet cables include at least one second Ethernet cable coupled between the third unit and the second unit.*

*51. The system of claim 49, wherein the system is configured to generate wireless communications signals in a licensed RF band using the data from the Ethernet device.*

*52. The system of claim 51, wherein the system is configured to generate wireless communication signals in the licensed RF band using the data from the Ethernet device to provide Worldwide Interoperability for Microwave Access (WiMAX) service.*

*53. The system of claim 49, wherein the transport signal conversion circuit is configured to organize the plurality of bits into communication frames, wherein each communication frame includes a certain number of bits allocated to payload data, and wherein the digitized RF data and the data from the Ethernet device are transported within the payload data of the communication frames.*

*54. The system of claim 49, wherein the transport signal conversion circuit is configured to organize the transport signal as a serial data stream or into a plurality of packets.*

* * * * *